July 24, 1962  R. H. DUMEZ  3,045,484
AERODYNAMIC STABILIZER FOR AIRCRAFT
Filed Jan. 9, 1959  4 Sheets-Sheet 1

INVENTOR
Raoul Henri Dumez
By
Watson, Cole, Grindle & Watson
ATTORNEYS

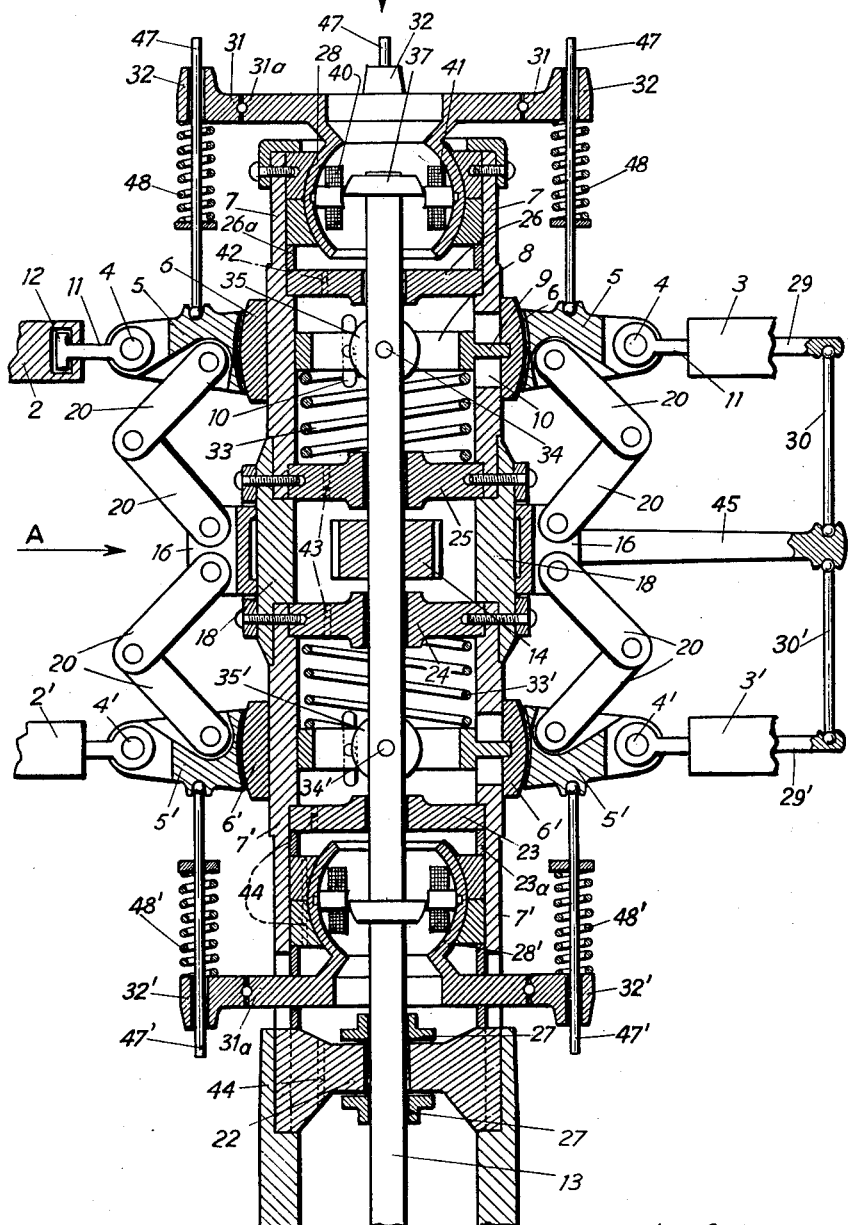

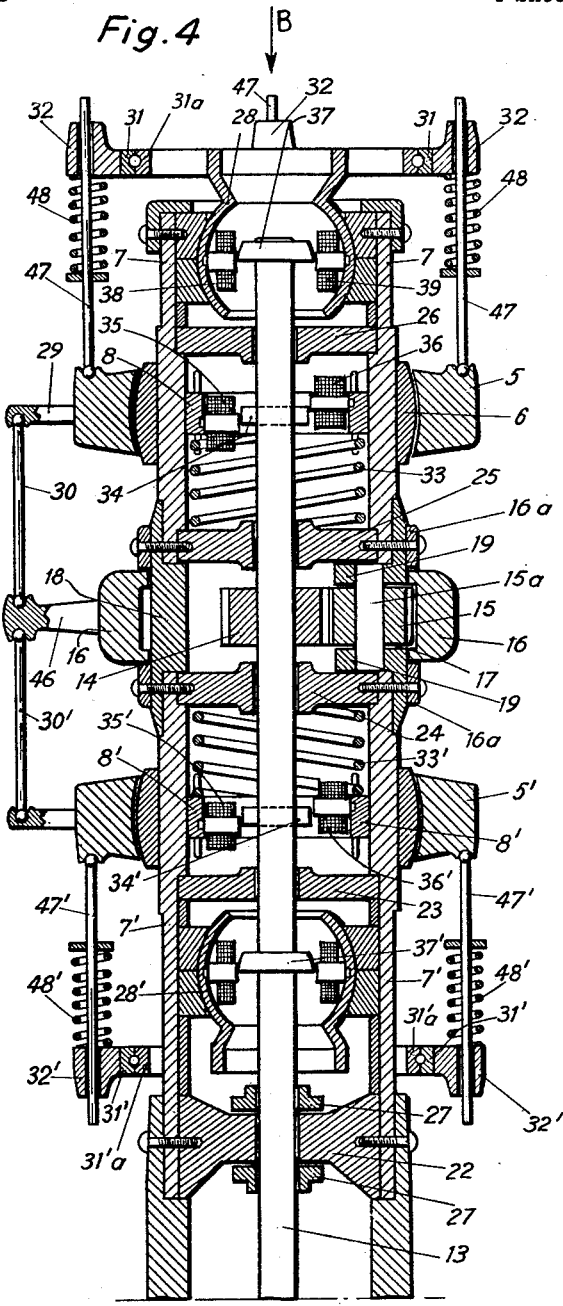

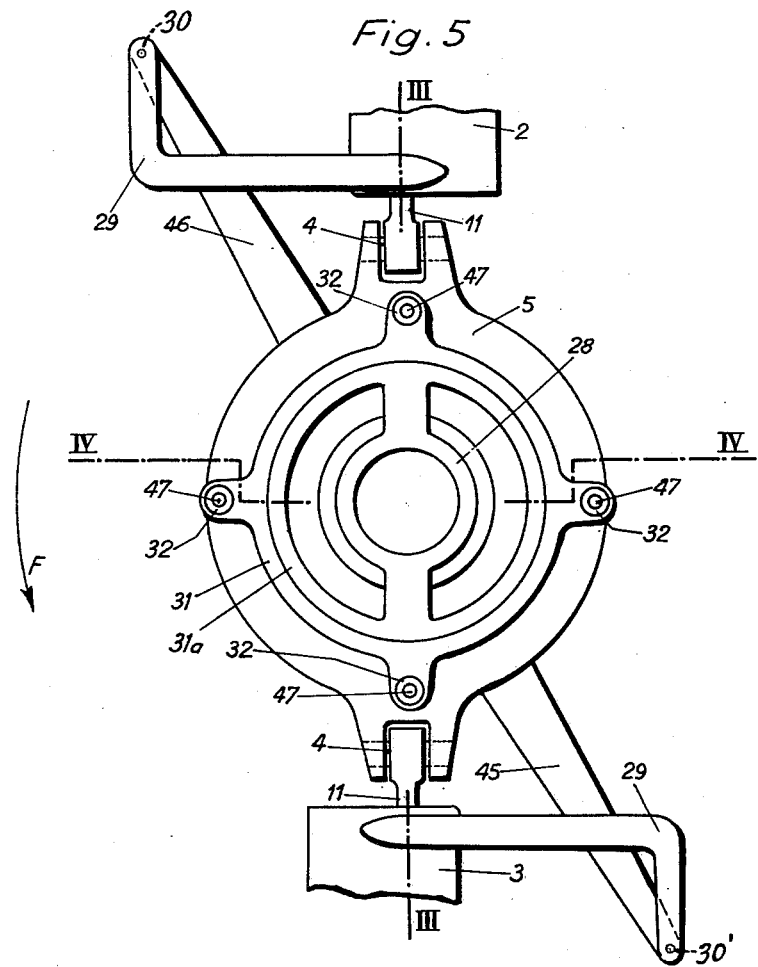

United States Patent Office 3,045,484
Patented July 24, 1962

3,045,484
AERODYNAMIC STABILIZER FOR AIRCRAFT
Raoul Henri Dumez, Montrouge, France, assignor to Société Nationale d'Etude et de Construction de Moteurs d'Aviation, a company of France
Filed Jan. 9, 1959, Ser. No. 785,974
Claims priority, application France Jan. 24, 1958
9 Claims. (Cl. 73—180)

In order to stabilise aircraft, the turn-indicator is available as an appliance which detects the angular velocities at which an aircraft pivots about its three reference axes (roll-yaw-pitch), but there is no simple appliance which allows translational movements of the aircraft parallel to these three axes to be detected.

The problem of detection arises more particularly in the case of vertical-take-off aircraft, which leave the ground at zero velocity.

The subject of the present invention is a device which detects these translational movements, and also allows rotational movements of the aircraft about two of these three axes to be detected. The device furthermore lends itself to making use of the detection obtained for the purpose of stabilising the aircraft.

The fundamental principle of this device, which will hereinafter be called a "wind vane," resides in using the aerodynamic reactions set up by the ambient air on rotating blades in consequence of the said translational and rotational movements, the said rotating blades being fitted with certain degrees of freedom after the manner of helicopter blades.

This device is preferably embodied by grouping the blades on two rotors disposed parallel to one another, the blades being of opposite incidences from one rotor to the other, so that the thrust to which one is subjected is in one direction, while the thrust to which the other is subjected is in the opposite direction.

These rotors, which are driven in the same direction and at the same speed, rotate, when in the neutral position, in two parallel planes perpendicular to the axis of rotation, while the reactions set up by the ambient air on the blades, in consequence of rotational or translational movements of the aircraft (other than rotation about the axis of the rotors) cause the blades to change their positions in such a manner as to allow movement on the part of the aircraft to be detected.

The device may also be embodied with the rotors rotating in opposite directions.

If it is supposed that the rotational axis of the rotors of the wind vane coincides with the roll axis (longitudinal axis) of the aircraft, which will be the preferred arrangement when the wind vane is used for stabilising aircraft which take off and land vertically, the detection process is as follows:

A translational movement of the aircraft along either its yaw or pitch axis will produce a symmetry in the thrust to which the rotating rotor blades are subjected. The "running" blade is subjected to a relative wind whereof the speed is equal to the circumferential speed of the blades plus the translational speed of the aircraft, while the "reversing" blade is subjected to a relative wind whereof the speed is equal to the circumferential speed of the blades minus the same translational speed.

The greater thrust on the side of the "running" blade tends to cause the rotor to tilt in the direction of the said thrust, but since the rotor behaves in the same manner as a gyroscope it will tilt in a direction perpendicular to that of the thrust which it receives, that is to say in the opposite direction to the translational movement of the aircraft.

Consequently, when the aircraft carries out a rectilinear translational movement, the two rotors, being of opposite pitch, will tilt in opposite directions for a given absolute value, and the value of translational speed may be detected by noting, for example, the difference in the angles of inclination of the two rotors, this difference being a function of the speed of translational movement.

If, instead of translational movement, the aircraft rotates about either its yaw or pitch axis, the two rotors tend to oppose this rotation in consequence of their gyroscopic stability, thus resulting in the appearance of a certain angle due to the delay between the plane of the blades and the axis of the craft. The two rotors will therefore tilt in the same direction, and with the same inclination, and it will be possible to detect the angular speed value by noting the sum of the angles of inclination of the rotors, which is a function of the said angular speed.

For a translational movement of the aircraft along its roll axis, the overall incidence of the blades will be modified on the two rotors, and the absolute value of taper or lift will give the value of translational speed, and the sign of the said taper or lift will give the direction of translational movement.

Rotational movements about the roll axis will not be detected, but such detection may be performed in the usual fashion by a suitably arranged turn-indicator.

The reactions of the rotors may be transmitted to the chain which operates and controls the steering members of the aircraft, so as to impart to the said members a pulse which returns the aircraft to the initial position chosen by the pilot.

It goes without saying that the device should be fitted to the aircraft at such a point as to be outside the atmospheric zones which are disturbed by the inlet of exhaust air of the propeller, and also outside the aerodynamic shadow of the aircraft when it is moving, in order not to be affected by the ambient air.

It should be noted that, since the device is not disposed at the centre of gravity of the aircraft, any rotation about the centre of gravity will be accompanied by the wind vane carrying out a translational movement proportional to the rotational movement. It will be easy to take this into account in order to correct the indications given.

It is advantageous to fit the wind vane in such a manner that it may be retracted into the aircraft or into a fairing during high-speed flights, in order to eliminate its drag and protect it from an excessively heavy relative wind. Thus, in the case of an aircraft which takes off and lands vertically, the wind vane will be used only during the vertical parts of flight, at low or zero velocity.

The following description, with reference to the appended drawings, will give a good understanding of the different features of the invention and the art of embodying them, any arrangement apparent both from the text and the figures naturally falling within the scope of the present invention.

FIGURE 3 is an axial section on a still larger scale taken along the line III—III of FIGURE 5 and showing the driving mechanism of the rotors and the system which detects the various reactions of the blades of the said rotors;

FIGURE 4 is an axial section perpendicular to that in FIGURE 3, on the same scale taken along the line IV—IV of FIGURE 5 and seen in the direction of the arrow "A" in FIGURE 3;

FIGURE 5 is a view from above in the direction of the arrow "B" in FIGURE 4, on the same scale.

Only the upper rotor will be described in detail, since both rotors consist of identical parts, and operate in the same manner. The reference numbers of the parts of the upper rotor will be applied to the corresponding parts of the lower rotor when the description requires them to be mentioned, but with an index, "dashed."

Figure 1:
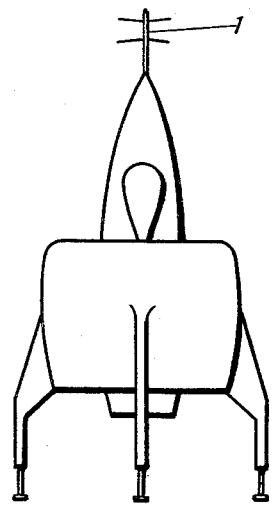
FIGURE 1 illustrates a vertical-take-off annular-wing aircraft to which is fitted a wind vane according to the invention at the forward end of the pilot's cockpit.
Figure 2:
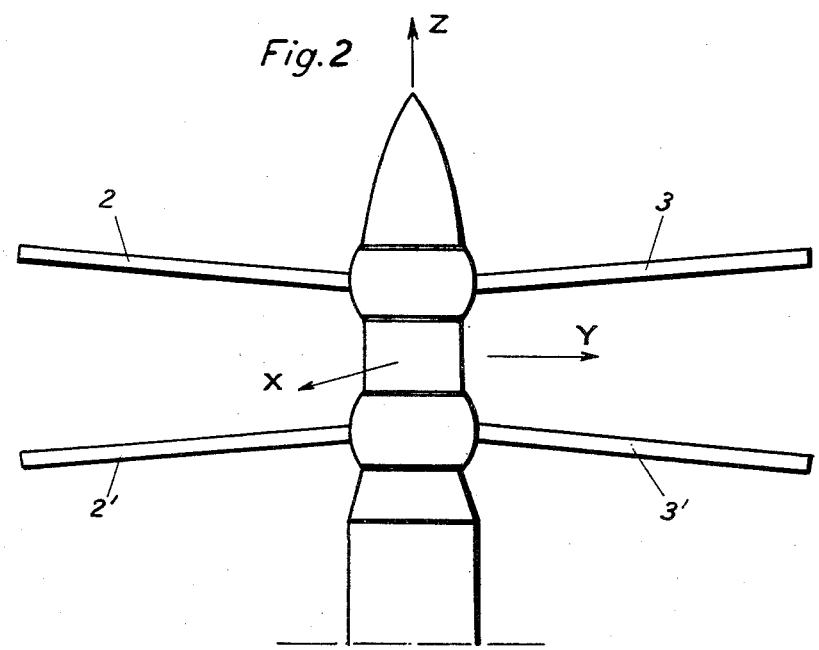
FIGURE 2 illustrates the wind vane on a larger scale.

FIGURES 1 and 2 show the wind vane 1 according to the invention, comprising two rotors, each having two diametrically opposed blades 2 and 3, 2' and 3'. FIGURES 3, 4 and 5 show that these blades are articulated to a blade-carrier rim or hub 5 about pivots 4 perpendicular to the axis of the rotors. The hub 5 rotates about a swivel-joint or spherical bearing 6 which is rotationally fixed, but can slide on the tubular piece 7, which is one of the parts providing stationary support for the wind vane.

A ring 8 sliding inside the piece 7 follows the translational movements of the swivel-joint 6 by means of catches 9 passing through slots 10 in the piece 7.

The blades are caused to vary in incidence, under control in a manner which will be described later, by rotating about an axis 11 disposed between the blade and the corresponding articulation 4. A retainer head 12 which may be seen in the detail section of the left-hand blade of the upper rotor in FIGURE 3 takes up the pull due to the centrifugal force exerted on the blades, to which is imparted a rotational movement about the axis of the shaft 13.

This shaft 13, which is set in rotation upon itself by a motor not shown, carries a pinion 14, which rotationally drives an internally toothed rim 16 by way of a pinion 15 (FIGURE 4). An aperture 17 in the middle piece 18 of the wind vane support allows the pinion 15 to act on the rim 16. Two internal bosses 19 in the piece 18 support the axis 15a of the pinion 15.

The internally toothed rim or ring gear 16, which rotates outside the middle piece 18 of the fixed support, and is held in place between two rings 16a fast with the said piece 18, drives the hubs 5, 5' of the rotors by way of the articulated links 20, which allow the hubs or rims 5 and 5' to oscillate freely on the respective swivel-joints 6 and 6'.

Transverse members 22, 23, 24, 25 and 26 support the bearings of the operating shaft 13. These transverse members are held in place in recesses in the pieces 7, 18 and 7' of the support. This fixing is carried out with the aid of spacing rings 23a and 26a, as regards the transverse members 23 and 26.

Two abutments 27 attached to the operating shaft 13, and situated on either side of the transverse member 22, hold the said shaft fast longitudinally.

The pitch of the blades, which must correspond to a fixed inclination of the hubs 5, 5', is periodically controlled as follows:

Horizontal arms 45 and 46 are supported for rotation by the rim or ring gear 16 to which they are affixed. At the radially outer free ends of each of these arms are swively connected the ends of links 30 and 30'. The opposite ends of the respective links are swively connected to the respective free ends of the elbow rods 29, 29' shown in FIGURE 5. It will be seen that each elbow rod is fixed to the radially inner end portion of one of the blades of its rotor and projects to one side of the axis of pitch adjustment of said blade to function as a control lever under the control of the rod 30 or 30', which couples it to its associated arm 46 or 45. It will thus be seen that relative axial movement of the rotors along the common axis defined by the drive shaft 13 will effect change of pitch of the respective blades. Moreover, the linkages between the blades of the respective rotors will be seen to be arranged in such manner that the blades of the respective rotors, which are already oppositely pitched, will have their pitch adjustment simultaneously changed to equal but opposite extents. Furthermore, with the construction illustrated, it will be seen that in consequence of the tilting of the rotors with respect to their rotational axis, as permitted by the co-action between their respective hubs 5, 5' and spherical bearings 6, 6', on which they are supported, there may be produced by the couplings between the blades of the respective rotors during each revolution a cyclical variation in the pitch adjustment of the blades.

The inclination of the rotors is transmitted to swivel-joints 28, 28' by way of rods 47, 47' (4 rods at 90° per swivel-joint), one end being articulated per swivel-joint to the hubs 5, 5', and the other sliding in bores in the bosses 32, 32' on the rims 31, 31', which are connected by means of ball-races to the plates 31a and 31'a fast with the swivel-joints 28, 28' respectively.

The overall variation in the incidence of the blades of a rotor is produced by displacement of the corresponding swivel-joint 6, and conversely any overall variation in the above incidence (that is to say in pitch and taper) involves displacement of the swivel-joint 6 and the ring 8 coupled to the said swivel-joint. By taper is meant the angular relationship of the blades of the respective rotors relative to each other in a plane parallel to the rotational axis of the rotors, it being borne in mind that this angular relationship or taper may vary incident to pivotal movements of the respective blades about their pivotal axes 4 and 4', as a result of varying operational conditions.

The length of the small links 30 will be determined so that, when the rotors are driven by the shaft 13 in the direction of the arrow "F" (FIGURE 5), at a constant speed which is determined once and for all, the blades bring the catches 9 to the mid-point of the apertures 10, by taking up a direction along them resultant of their centrifugal force, their lift, and the action of the compensating springs 33, 33' and 48, 48'.

In this position, the blades of the rotors will have, in one case, a positive incidence, and in the other case a negative incidence or, in other words, they will have opposite pitches.

A description will now be given of a non-limitative example of means which may be imagined, regard being had to the above mechanical arrangement, for detecting, on the one hand, axial displacements along the axis of shaft 13 of the rings 8, 8' and their associated rotors in the two directions situated on either side of their mean position, and on the other hand the inclination of the swivel-joints 28, 28', and their associated rotors in each of two rectangular planes corresponding to the pitch and yaw axes of the aircraft.

In the example of embodiment illustrated, a permanent magnet 34 attached to the operating shaft 13 is so disposed as to set up, when rotating, a magnetic field concentrated in a plane perpendicular to the shaft 13, and coinciding with the mean plane of the ring 8 in the neutral position. Two coils 35, 36 are attached to the ring 8 in such a fashion that, when the latter is in the neutral position, their cores are situated on either side of the plane of the said magnetic field.

Any displacement of the ring 8 parallel to the axis of the shaft 13 will therefore bring the magnetic field nearer to the core of one of these two coils, and move it away from the core of the other coil. The electromotive force in the first coil will therefore be increased, and the electromotive force in the second will be reduced. These differential variations in electromotive force across the terminals of the coils will be proportional to the displacements of the ring 8 and of the swivel-joint, that is to say proportional to the overall variations in the incidence of the blades 2, 3 of the rotor, and in its lift and taper.

Another permanent magnet 37 sets up a magnetic field in a plane passing above the centre of the swivel-joint 28, and perpendicular to the shaft 13. Two pairs of coils 38—39, 40—41 are attached to the swivel-joint 28, in such a manner that their cores are in opposition in pairs along two rectangular axes whereof one is parallel to the yaw axis and the other to the pitch axis, and so that the said cores are situated in a plane passing through the centre of the swivel-joint 28, and parallel to the field of the magnet 37.

Any rotation of the swivel-joint 28 will differentially displace each pair of coils in the magnetic field, and the variations in the electromotive force across the terminals of the coils will be proportional to the inclination of the rotor.

By suitably connecting up the above various coils to the chain which operates and controls the steering members of the aircraft, pulses may be produced which will stabilise the aircraft in the position chosen by the pilot, any displacement of the aircraft, other than pure rotation about the axis of the shaft 13 (which, in the example chosen, coincides with the roll axis of the aircraft), setting up a reaction on the wind vane which brings the control chain into action.

In the various figures, the electrical connections have not been shown in order to make the drawings clearer, but it is within the skill to be expected of a worker familiar with the art to work out a system of wiring.

What I claim is:

1. In a vertical take-off and landing aircraft, a sensing device sensitive to the displacements of said aircraft with respect to ambient air, and comprising a tubular element, at least one part spherical bearing rotatably fixed but slidable on said tubular element, a rotor rotatably and tiltably mounted on said bearing, a plurality of aerodynamically shaped blades pivoted on said rotor and of variable incidence, a rotatable member mounted on the tubular element for rotatable but non-axial motion and driven by a motor at a constant speed, articulated link means connected between said rotatable member and said rotor for driving said rotor in rotation, link connections between said rotatable member and said blades whereby areodynamic reactions of ambient air on said blades upon displacement of said aircraft cause said blades to slide said spherical bearing on said tubular element and to incline said rotor with respect to said tubular element, and first sensing means for sensing said displacement of said bearing and second sensing means for sensing said inclination of said rotor.

2. A device according to claim 1 including a second said bearing fixed against rotation but slidable on said tubular element, a rotor rotatably and tiltably mounted on said second bearing, a plurality of aerodynamically shaped blades pivoted on said last mentioned rotor and of variable incidence, and link connections between said last mentioned blades and said rotatable member, said link connections and rotatable member interconnecting the blades of the respective rotors for pitch changing movement responsive to relative movement between the rotors.

3. A device according to claim 2 in which said link connections comprise arms fixed on said rotatable member, links articulated on said arms, and posts articulated on said links on one end and each fixed on one of said blades on the other end, so that when the rotors are in a mean position the pitch of the blades of one is equal and opposite to the pitch of the blades of the other, when the rotors are similarly displaced the pitch of the blades varies in a sense opposite to the pitch of the blades of the other, and when the rotors are oppositely displaced the pitch of the blades of both are varied in the same sense.

4. A device according to claim 1 including a universal joint carried by said tubular element, and in which said rotor is provided with means transmitting angular movement to a member of said universal joint.

5. A device according to claim 4 in which said sensing means comprises magnetic members and means supporting said magnetic members in axially fixed locations relative to said tubular element substantially corresponding to the normal axial locations respectively of said spherical bearing and said universal joint member.

6. A device according to claim 5 in which the means supporting said magnetic members comprises a driving spindle supported for rotation in said tubular member.

7. A device according to claim 6 in which the said member comprises an internally toothed annulus extending about the tubular element and geared to said spindle in driven relation thereto.

8. A device according to claim 7 including coils carried by said universal joint member and by said bearing and disposed to sense displacement of said universal joint member and said bearing with respect to the said magnetic members.

9. In a vertical take-off and landing aircraft, a sensing device sensitive to the displacements of aircraft with respect to ambient air, and comprising a tubular element, at least one spherical bearing rotatably fixed but slidable axially on said tubular element, a rotor mounted on said bearing for rotation about the axis of said tubular element and for bodily angular adjustment in a direction parallel to the axis of said tubular element, a plurality of aerodynamically shaped blades pivoted on said rotor and of variable incidence, a rotatable member and means driving said rotatable member at a constant speed, said rotatable member being axially fixed on said tubular element, articulated and axially extensible link means connected between said rotatable member and said rotor for transmitting rotation from the said member to the rotor in any of the various axial positions of the rotor, link connections between said rotatable member and said blades for transmitting reaction forces from said blades to said bearing to slide said spherical bearing axially on said tubular element and to incline said rotor with respect to said tubular element responsive to aerodynamic reactions of ambient air on said blades.

References Cited in the file of this patent
UNITED STATES PATENTS
1,800,470    Oehmichen _____ Apr. 14, 1931